United States Patent
Kayanuma et al.

(10) Patent No.: US 8,213,762 B2
(45) Date of Patent: Jul. 3, 2012

(54) LIGHTGUIDE PLATE AND LIGHTGUIDE PLATE MANUFACTURING METHOD

(75) Inventors: Yasuaki Kayanuma, Fujiyoshida (JP); Daisaku Okuwaki, Fujiyoshida (JP)

(73) Assignee: Citizen Electronics Co., Ltd., Yamanashi-Ken (JP)

( * ) Notice: Subject to any disclaimer, the term of this patent is extended or adjusted under 35 U.S.C. 154(b) by 325 days.

(21) Appl. No.: 12/546,130

(22) Filed: Aug. 24, 2009

(65) Prior Publication Data

US 2010/0048085 A1 Feb. 25, 2010

(30) Foreign Application Priority Data

Aug. 25, 2008 (JP) .................................. 2008-215933

(51) Int. Cl.
*G02B 6/10* (2006.01)
(52) U.S. Cl. ............. 385/146; 445/23; 385/130; 385/14
(58) Field of Classification Search .................. 385/146, 385/130, 14; 445/23
See application file for complete search history.

(56) References Cited

U.S. PATENT DOCUMENTS

| | | | | |
|---|---|---|---|---|
| 4,946,235 | A * | 8/1990 | Scozzafava et al. | 359/328 |
| 6,435,734 | B2 * | 8/2002 | Okada et al. | 385/88 |
| 6,530,698 | B1 * | 3/2003 | Kuhara et al. | 385/88 |
| 7,228,020 | B2 * | 6/2007 | Weigert | 385/14 |
| 2004/0130912 | A1 | 7/2004 | Miyashita | |
| 2005/0254770 | A1 * | 11/2005 | Watanabe | 385/137 |
| 2007/0025671 | A1 * | 2/2007 | Shimizu et al. | 385/129 |
| 2007/0147760 | A1 * | 6/2007 | Iimura | 385/129 |
| 2009/0014305 | A1 | 1/2009 | Aihara et al. | |
| 2010/0027947 | A1 * | 2/2010 | Dutta | 385/88 |
| 2011/0075981 | A1 * | 3/2011 | Makino et al. | 385/126 |

FOREIGN PATENT DOCUMENTS

| | | |
|---|---|---|
| JP | 2000-249837 | 9/2000 |
| JP | 2002-42502 | 2/2002 |
| JP | 2009-21142 | 1/2009 |

* cited by examiner

*Primary Examiner* — Ellen Kim
(74) *Attorney, Agent, or Firm* — Wenderoth, Lind & Ponack, L.L.P.

(57) ABSTRACT

A film-shaped lightguide plate having high light entrance efficiency, and which is easy to make, has a lightguide plate body having an upper surface as a light-exiting surface, a lower surface opposite to the upper surface, and a peripheral side surface extending between the respective peripheral edges of the upper and lower surfaces. A circumferential part of the peripheral side surface forms a light-entrance surface that faces a light source. The lightguide plate further has an additional lightguide portion formed on at least one of the upper and lower surfaces of the lightguide plate body at the light-entrance surface side. The additional lightguide portion has a light-entrance surface facing the light source, together with the light-entrance surface of the lightguide plate body. The additional lightguide portion receives light from the light source through its light-entrance surface and guides the light into the lightguide plate body.

8 Claims, 7 Drawing Sheets

[Fig.1]
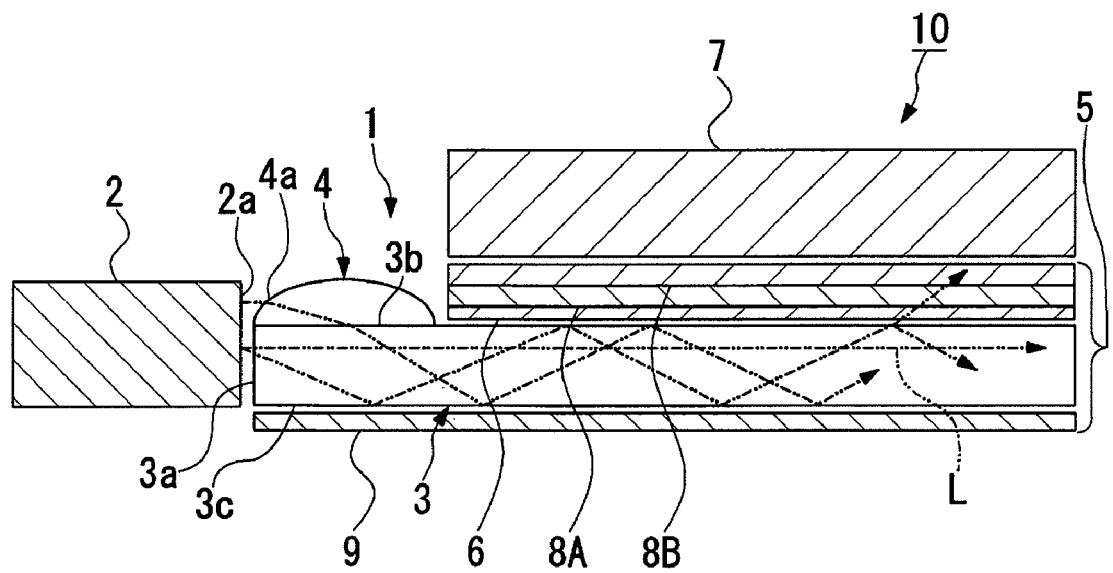
[Fig.2]
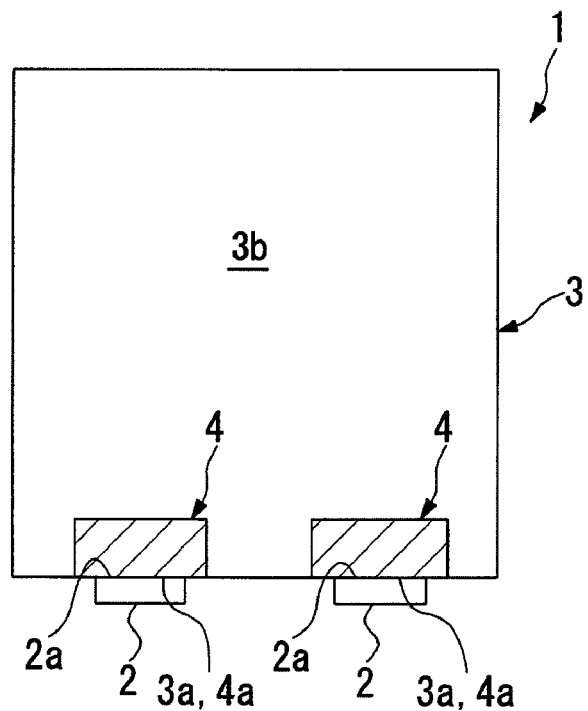

[Fig.3]
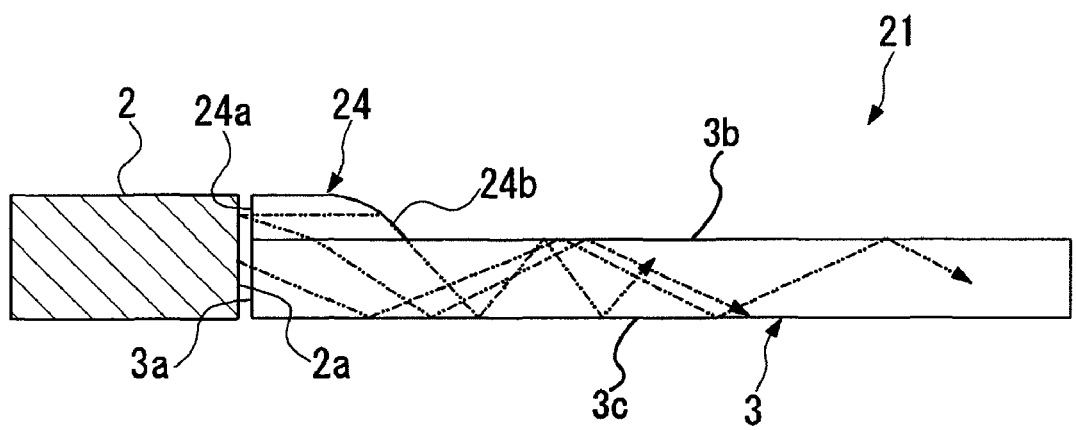
[Fig.4]
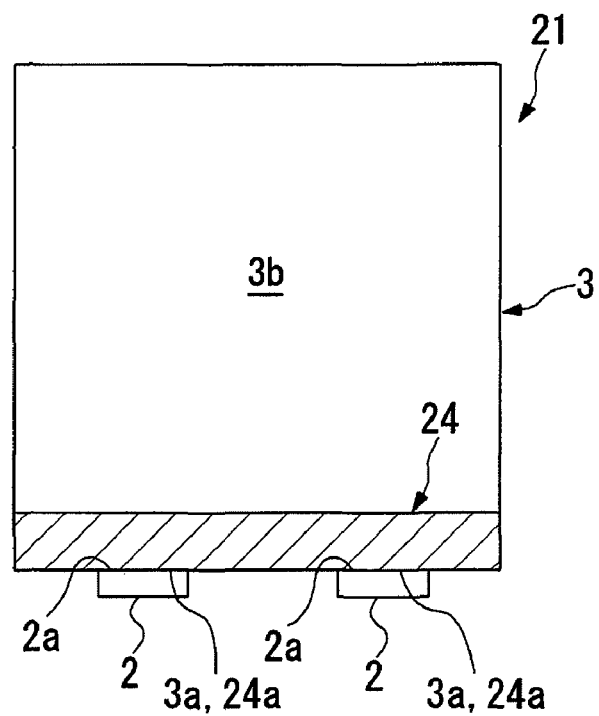

[Fig.5]
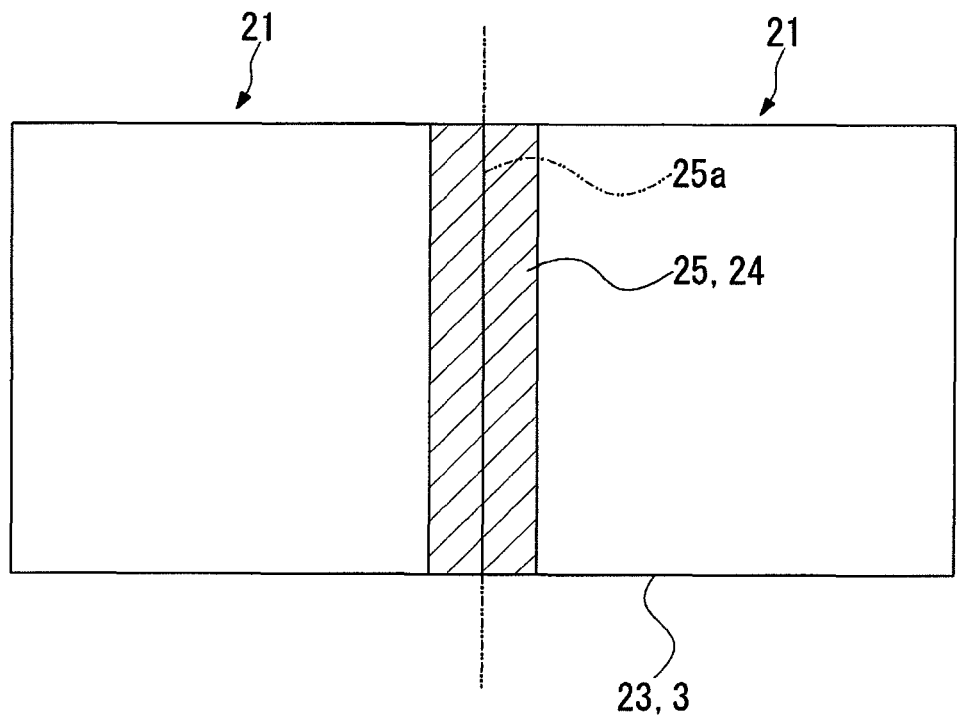
[Fig.6]
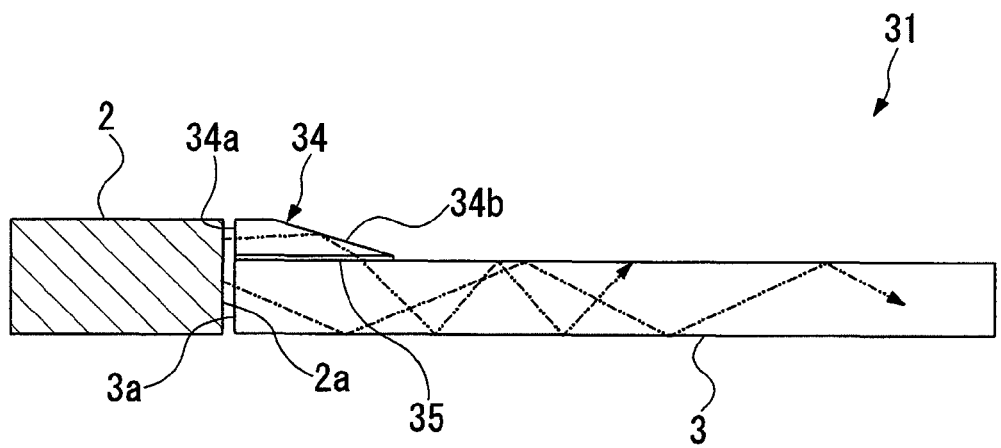

[Fig.7]
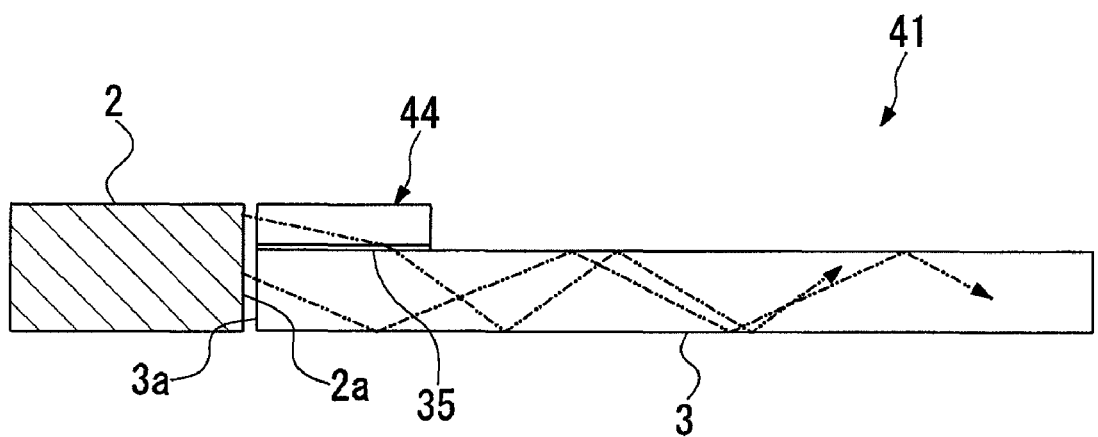
[Fig.8]
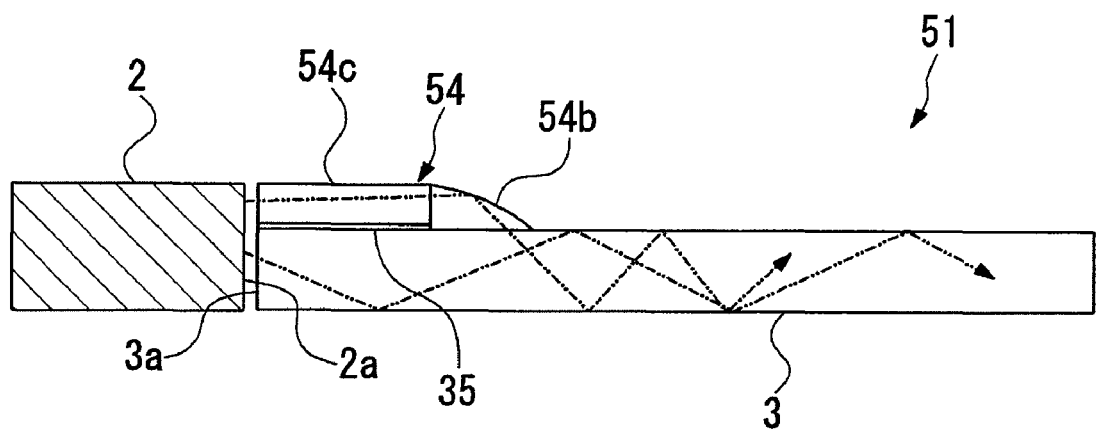

[Fig.9]
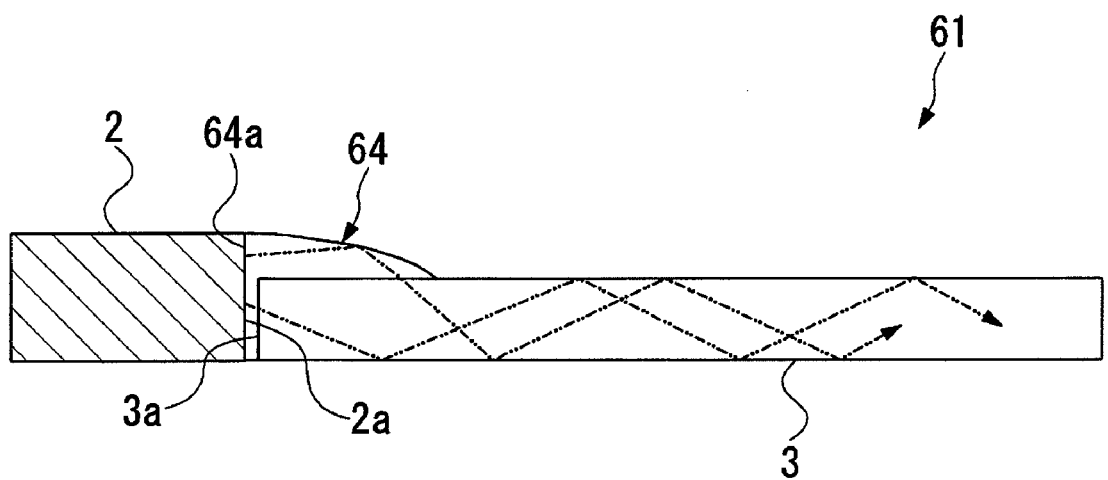
[Fig.10]
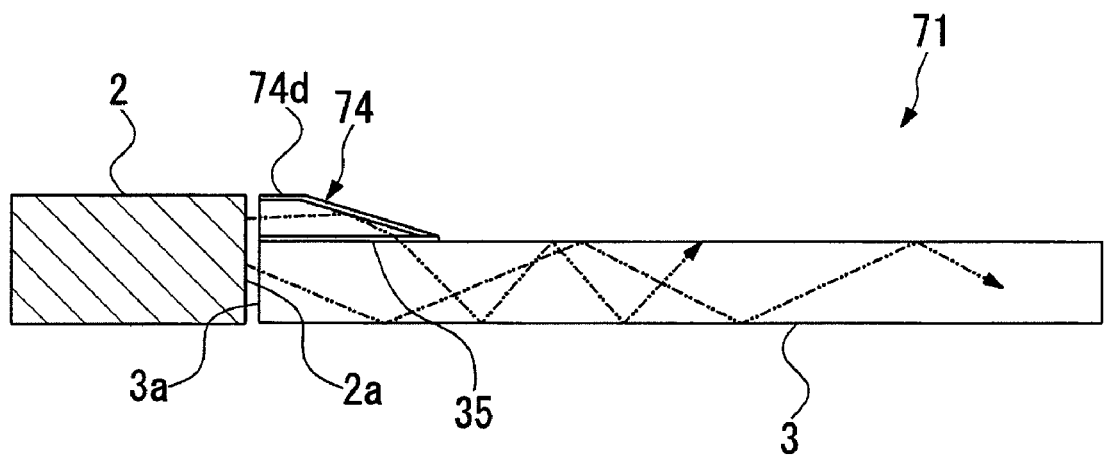

[Fig.11]
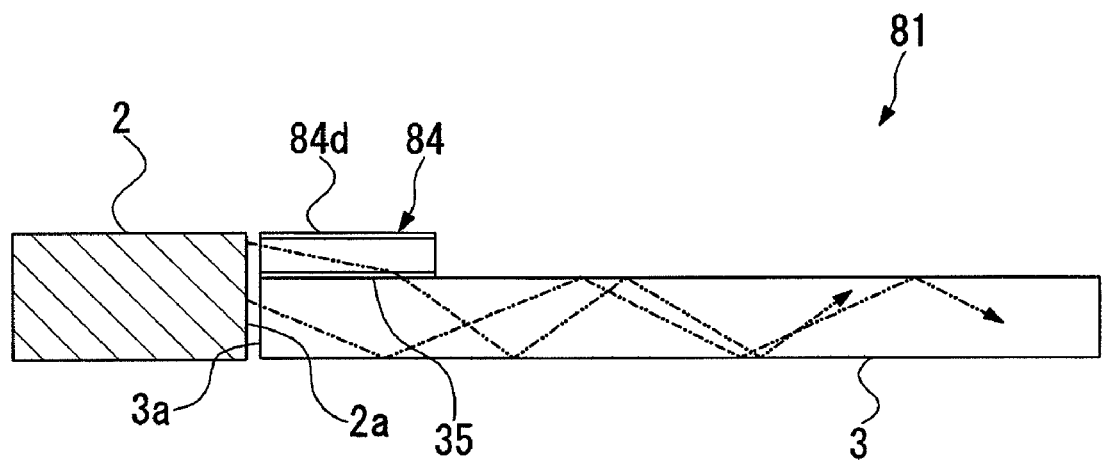
[Fig.12]
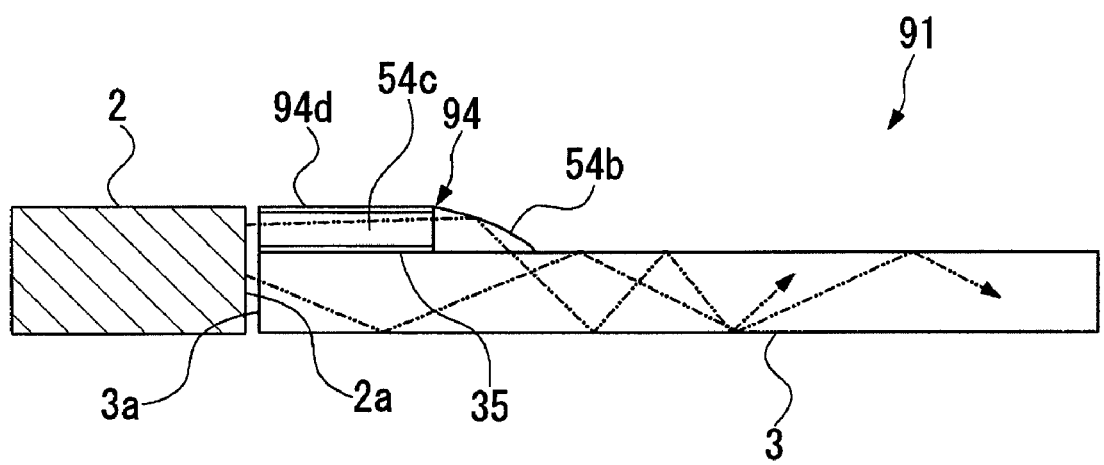

[Fig.13]
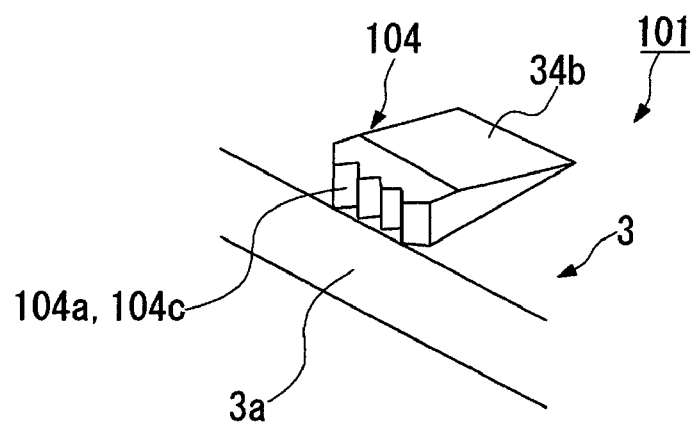
[Fig.14]
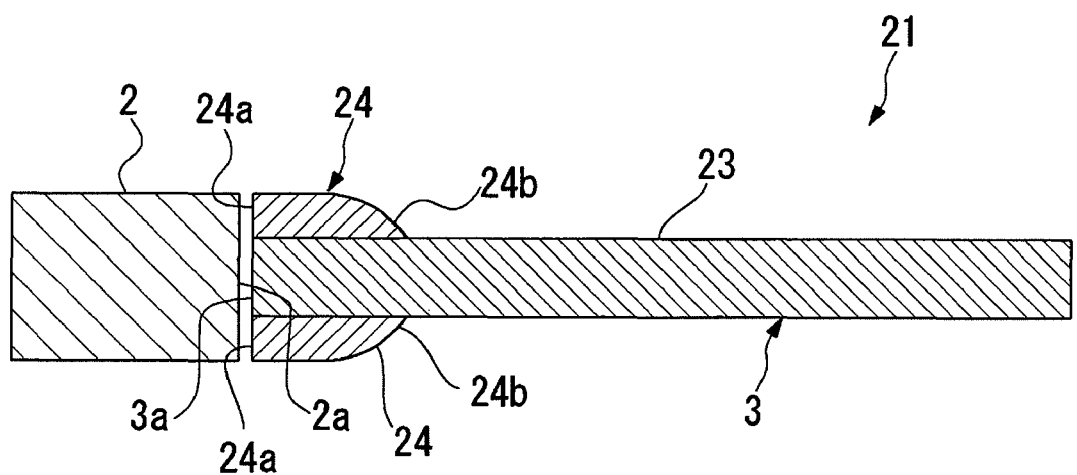

LIGHTGUIDE PLATE AND LIGHTGUIDE PLATE MANUFACTURING METHOD

This application claims priority under 35 U.S.C. §119 to Japanese Patent application No. JP2008-215933 filed on Aug. 25, 2008, the entire contents of which are hereby incorporated by reference.

TECHNICAL FIELD

The present invention relates to a lightguide plate that illuminates a liquid crystal display panel or the like. The present invention also relates to a method of manufacturing such a lightguide plate.

BACKGROUND ART

Liquid crystal display apparatuses for image display are widely used in the displays of mobile phones, notebook personal computers (PCs), car navigation systems, mobile PCs, personal digital assistants (PDAs), automatic teller machines (ATMs), etc. Such a liquid crystal display apparatus employs a lightguide plate as a part of a backlight unit that applies illuminating light to a liquid crystal display panel from the back of the display panel to enhance the luminance of the display screen of the display panel.

The backlight unit has a lightguide plate and a light-emitting diode (LED) or other light source disposed along a light-entrance surface of the lightguide plate. The lightguide plate guides light from the light source through it and emits the guided light toward the liquid crystal display panel from the whole of its light-exiting surface that faces the display panel. Recently, there has been an increased demand for reduction in thickness of backlight units in accordance with the reduction in thickness of apparatuses in which backlight units are incorporated. Under these circumstances, film-shaped lightguide plates in particular have been increasingly employed. However, when using a lightguide plate that is shorter in height than the light-exiting surface of the associated light source as in the case of a film-shaped lightguide plate, a part of light from the light source fails to enter the light-entrance surface of the lightguide plate and leaks, resulting in a loss of light entering the lightguide plate, which causes a reduction in luminance at the light-exiting surface of the lightguide plate.

To solve this problem, Japanese Patent Application Publication No. 2000-249837, for example, proposes a lightguide plate having a lightguide plate body and a lightguide block bonded to the lightguide plate body along one side edge of the lightguide plate body and extends toward a light source from the side edge with its wide light-entrance surface facing the light-exiting surface of the light source. This lightguide plate receives light not through the light-entrance surface of the lightguide plate body, which is thin, but through the wide light-entrance surface of the lightguide block and guides the received light into the lightguide plate body through the lightguide block.

Japanese Patent Application Publication No. 2002-42502 proposes a film-shaped lightguide plate locally increased in thickness at a part along its side edge facing the associated light source to make it possible to receive light from the light source without leakage.

The above-described conventional techniques, however, still have the following problems to be solved.

With the technique disclosed in Japanese Patent Application Publication No. 2000-249837, the lightguide plate receives light from the light source through the lightguide block and guides the light by refraction into the lightguide plate body. Accordingly, the light-guiding process is attended with a large loss of light. In addition, the structure interferes with the reduction in thickness of the lightguide plate for the reason that a lightguide block having a light-entrance surface with a height corresponding to the light source is stacked on the lightguide plate body.

According to the technique disclosed in Japanese Patent Application Publication No. 2002-42502, the film-shaped lightguide plate is increased in thickness only at its side edge part facing the light source. Therefore, the lightguide plate is difficult to produce by injection molding and cannot be manufactured by roll forming.

SUMMARY OF THE INVENTION

The present invention has been made in view of the above-described problems. Accordingly, an object of the present invention is to provide a lightguide plate manufacturing method that can produce a lightguide plate reduced in thickness and having increased efficiency of light entering the lightguide plate from the adjacently disposed light source to provide high luminance at its light-exiting surface. Another object of the present invention is to provide a lightguide plate manufactured by the above-described method.

The present invention provides a lightguide plate manufacturing method including the step (a) preparing for a lightguide film, the step (b) applying a setting resin directly to a predetermined linear region on the lightguide film, the step (c) hardening the setting resin to form an additional lightguide portion, and the step (d) cutting the lightguide film with the additional lightguide portion provided on the lightguide film along a length direction of the predetermined linear region to obtain a lightguide plate in which a cut surface of the lightguide film and a cut surface of the additional lightguide portion are flush with each other. The lightguide plate has the cut lightguide film as a lightguide plate body, the cut surface of the lightguide film as a light-entrance surface of the lightguide plate body, the cut additional lightguide portion, as a light-entrance surface of the additional lightguide portion. The additional lightguide portion receives light from a light source through its light-entrance surface and guides the light into the lightguide plate body. In addition, the present invention provides a lightguide plate manufactured by the above-described method.

The lightguide plate of the present invention mainly receives light from the light source directly through the light-entrance surface of the lightguide plate body. In addition, the lightguide plate receives light failing to enter through the light-entrance surface of the lightguide plate body, which is thin, through the light-entrance surface of the additional lightguide portion and guides the light into the lightguide plate body. Thus, it is possible to obtain high efficiency of light entering the lightguide plate and to obtain high luminance at the light-exiting surface of the lightguide plate. Further, the lightguide plate can receive light from the light source with the total thickness of the lightguide plate body and the additional lightguide portion being made equal to the height of the light-exiting surface of the light source, therefore the overall thickness of the lightguide plate can be formed in accordance with the thickness of the light source. Thus, the structure of the present invention will not interfere with the reduction in thickness. Further, the additional lightguide portion is formed by applying a setting resin directly to a predetermined linear region on the lightguide plate body in making the lightguide plate. Therefore, the additional lightguide portion can be formed, without the difficulty of the second conventional technique described above. Thus, the lightguide plate can be readily produced in conformity to the size of the light source, and the production cost can be reduced.

Specifically, the light source may be an LED light source, and the lightguide plate body may be a film-shaped lightguide plate. The lightguide plate body may have a constant thickness. Cost reduction can be achieved by employing a thin film-shaped lightguide plate that is mass-produced by roll-to-roll processing.

The additional lightguide portion may have a refractive index that is lower than a refractive index of the lightguide plate body. This is to prevent total reflection of light when light enters the lightguide plate body from the additional lightguide portion and to increase the light entrance efficiency.

The additional lightguide portion can be formed from a setting resin applied directly to the lightguide plate body and hardened. It can be formed by using a transparent or a translucent setting resin, e.g. an ultraviolet curing resin, or a thermosetting resin, therefore, the additional lightguide portion can be formed on the lightguide plate body easily and at reduced cost by potting or a coating technique for printing.

In addition, the setting resin may be filled in the gap between the light-exiting surface of the light source on the one hand and, on the other, the respective light-entrance surfaces of the lightguide plate body and the additional lightguide portion. By so doing, the air layer is eliminated between the light-exiting surface of the light source and the light-entrance surfaces of the lightguide plate body and the additional lightguide portion. Accordingly, it is possible to reduce the loss of light due to reflection at the interface. In addition, the light source and the lightguide plate can be properly positioned and secured to each other, which facilitates the handling of the lightguide plate.

The additional lightguide portion may be a molded resin member bonded to the lightguide plate body. By doing so, additional lightguide portions having various configurations can be made with high accuracy.

The additional lightguide portions may have a flat light-entrance surface disposed to face parallel to the light-exiting surface of the light source and an upper surface, which is contiguous with the light-entrance surface and extends in a direction away from the light source. The upper surface may have a tapered or inclined surface that is opposite to the light entrance surface of the additional lightguide portion and extends from a top end of the additional light guide portion to the upper surface of the lightguide plate body. When the additional lightguide portion is formed by applying a setting resin directly to the lightguide plate body by printing, for example, the inclined surface can be formed easily by gradually reducing the printing area in a series of a plurality of printing processes. The inclined surface reflects light entering through the light-entrance surface toward the lightguide plate body to guide the light into the lightguide plate body. With this structure, higher light entrance efficiency can be obtained.

The additional lightguide portion may have a reflecting member, a reflecting layer or a reflecting optical configuration provided on its upper surface to reflect light guided through it toward the lightguide plate body. Reflecting light entering the additional lightguide portion and guiding it into the lightguide plate body enables higher light entrance efficiency to be obtained. To form such a reflecting layer, the lightguide plate manufacturing method further includes the step of forming a reflecting layer on the additional lightguide portion hardened in the predetermined linear region by vapor deposition or printing and so on after the step of applying a setting resin directly and hardening the setting resin. Then, the lightguide film with the additional lightguide portion and the reflecting layer formed on the additional lightguide portion is cut along a length direction of the predetermined linear region to obtain a lightguide plate in which a cut surface of the lightguide film and respective cut surfaces of the reflecting layer and the additional lightguide portion are flush with each other. Thus, light-entrance surfaces are formed by the respective cut surfaces of the lightguide film and the additional lightguide portion. At the same time, it is possible to easily form a reflecting layer that reflects light going outward of the lightguide plate in the additional lightguide portion back into the lightguide plate.

The light-entrance surface of the additional lightguide portion may be formed with a light-entrance optical configuration that diffuses entering light by refraction. This is to further increase the efficiency of light entering the lightguide plate body and to improve the luminance uniformity on the light-exiting surface.

The light source may comprise a plurality of light sources provided being spaced from each other in the width direction of the light-entrance surface of the lightguide plate body, and there may be provided a plurality of additional lightguide portions spaced from each other to align with the optical axes of light from the light sources, respectively. The additional lightguide portion may be an elongated lightguide portion extending continuously in the width direction of the light-entrance surface of the lightguide plate body.

The additional lightguide portion may have a substantially semielliptic or rectangular sectional configuration as seen from its side.

In the case of an additional lightguide portion having a rectangular sectional configuration, the additional lightguide portion may have an extension that extends in an extending direction of the optical axis of the light source. The additional lightguide portion is formed by applying a transparent or translucent setting resin to the surface of the lightguide plate body and hardening the setting resin. The upper surface of the additional lightguide portion has a tapered or inclined surface that is opposite to the light entrance surface of the additional lightguide portion and extends from a top end of the additional light guide portion to the upper surface of the lightguide plate body.

The additional lightguide portion may be provided on each of the upper and lower surfaces of the lightguide plate body. In this case, the lightguide plate manufacturing method includes the steps of (a) preparing for a lightguide film, (b) applying a setting resin directly to a predetermined linear region on an upper surface of the lightguide film, (c) hardening the setting resin to form an additional upper lightguide portion, (d) applying a setting resin directly to a linear region on a lower surface of the lightguide film to form an additional lower lightguide portion that is opposite to the additional upper lightguide portion on the upper surface, (e) hardening the setting resin of the additional lower lightguide portion; and (f) cutting the lightguide film with the additional upper lightguide portion provided on the upper surface of the lightguide film and the additional lower lightguide portion provided on the lower surface of the lightguide film along a length direction of the predetermined linear regions to obtain a lightguide plate in which a cut surface of the lightguide film and respective cut surfaces of the additional upper and lower lightguide portions are flush with each other.

With the above-described method, the cut surface of the lightguide film and the respective cut surfaces of the additional lightguide portions provided on the upper and lower surfaces are aligned to be flush with each other. Therefore, the additional lightguide portions can have sectional configurations conforming to the shape of the light-exiting surface of the light source, e.g. semicircular, substantially semielliptic, parallelogram or rectangular sectional configurations, which are added onto the upper and lower surfaces of the lightguide plate body.

Further, reflecting layers may be formed on the additional lightguide portions provided on the upper and lower surfaces of the lightguide plate body. In this case, the lightguide plate manufacturing method further includes the step of forming reflecting layers on the additional upper and lower lightguide portions provided on the upper and lower surfaces of the lightguide film by vapor deposition or printing and so on after the step (e). Then, the lightguide film is cut in a predetermined linear region where the additional lightguide portions and the reflecting layers are stacked on the lightguide film. Thus, light-entrance surfaces are formed by the respective cut surfaces of the lightguide film and the additional lightguide portions. At the same time, it is possible to easily form reflecting layers that reflect light going outward of the lightguide plate body in the additional lightguide portions back into the lightguide plate body.

A planar light unit according to the present invention has the above-described lightguide plate of the present invention and a light source having a light-exiting surface disposed to face the light-entrance surfaces of the lightguide plate body and the additional lightguide portion. Because of having the lightguide plate of the present invention, the planar light unit can be used as a thin backlight unit or the like having high efficiency of light entering from the light source and favorably high luminance.

A display apparatus according to the present invention has an image display panel and the above-described planar light unit of the present invention that is disposed at the front or the back side of the image display panel. That is, the display apparatus has the above-described planar light unit of the present invention disposed at the front or back side of the image display panel. Therefore, the apparatus can be reduced in overall thickness and can perform image display with high luminance.

In the display apparatus of the present invention, the image display panel may be a liquid crystal display panel. In other words, the display apparatus may be a liquid crystal display apparatus using a liquid crystal display panel. Therefore, the apparatus can be further reduced in overall thickness, weight and cost. In addition, high-luminance liquid crystal display can be obtained.

The lightguide plate manufacturing method of the present invention includes the step of applying a setting resin directly to a predetermined linear region on a lightguide film and hardening the resin, and the step of cutting the lightguide film together with the setting resin in the center of the setting resin to obtain a lightguide plate having the cut lightguide film as a lightguide plate body, the cut surface of the lightguide film as a light-entrance surface of the lightguide plate body, the cut setting resin as an additional lightguide portion, and the cut surface of the setting resin as a light-entrance surface of the additional lightguide portion. The additional lightguide portion receives light from a light source through its light-entrance surface and guides the light into the lightguide plate body.

Thus, the lightguide plate manufacturing method has the step of applying a setting resin directly to a predetermined linear region on a lightguide film and hardening the resin, and the step of cutting the lightguide film, together with the setting resin, in the center of the setting resin to make the lightguide plate body and the additional lightguide portion. Therefore, simply by applying a setting resin to a large-sized lightguide film and cutting the lightguide film, together with the setting resin, it is possible to form an integrated light-entrance surface having a height sufficient for the lightguide plate to receive light, which comprises the light-entrance surface of the lightguide plate body and the light-entrance surface of the additional lightguide portion that is flush with the light-entrance surface of the lightguide plate body. In addition, the lightguide plate of the present invention can be readily mass-produced. The additional lightguide portion may be provided with an inclined surface at a position opposite to its light-entrance surface. In such a case, when the setting resin is applied repeatedly by printing, for example, the width of the area over which the setting resin is printed on the linear region is gradually narrowed. By so doing, a tapered surface can be formed easily.

The lightguide plate according to the present invention receives light through both the lightguide plate body and the additional lightguide portion and therefore can guide the light from the light source without leakage. Accordingly, high light entrance efficiency and high luminance can be obtained. In addition, the lightguide plate can be reduced in thickness in correspondence to the height of the light-exiting surface of the light source. Accordingly, the planar light unit and display apparatus having the lightguide plate can be reduced in overall thickness and can provide image display with high luminance.

Embodiments of the lightguide plate according to the present invention will be explained below with reference to the accompanying drawings. It should be noted that, in the figures used in the following explanation, the scale is properly changed to show each member in a recognizable size and thus the components are not necessarily drawn to scale.

BRIEF DESCRIPTION OF THE DRAWINGS

FIG. 1 is a longitudinal sectional side view showing a display apparatus having a lightguide plate according to a first embodiment of the present invention.

FIG. 2 is a plan view of the lightguide plate and light sources in FIG. 1, showing the positional relationship between them.

FIG. 3 is a longitudinal sectional side view of a lightguide plate according to a second embodiment of the present invention and light sources, showing the way in which the lightguide plate guides light from the light sources.

FIG. 4 is a plan view of the lightguide plate according to the second embodiment and the light sources, showing the positional relationship between them.

FIG. 5 is a plan view for explaining a method of manufacturing the lightguide plate according to the second embodiment, showing the way in which a setting resin is applied to a film-shaped lightguide plate and hardened.

FIG. 6 is a longitudinal sectional side view of a lightguide plate according to a third embodiment of the present invention and light sources, showing the way in which the lightguide plate guides light from the light sources.

FIG. 7 is a longitudinal sectional side view of a lightguide plate according to a fourth embodiment of the present invention and light sources, showing the way in which the lightguide plate guides light from the light sources.

FIG. 8 is a longitudinal sectional side view of a lightguide plate according to a fifth embodiment of the present invention and light sources, showing the way in which the lightguide plate guides light from the light sources.

FIG. 9 is a longitudinal sectional side view of a lightguide plate according to a sixth embodiment of the present invention and light sources, showing the way in which the lightguide plate guides light from the light sources.

FIG. 10 is a longitudinal sectional side view of a lightguide plate according to a seventh embodiment of the present invention and light sources, showing the way in which the lightguide plate guides light from the light sources.

FIG. 11 is a longitudinal sectional side view of a lightguide plate according to an eighth embodiment of the present invention and light sources, showing the way in which the lightguide plate guides light from the light sources.

FIG. 12 is a longitudinal sectional side view of a lightguide plate according to a ninth embodiment of the present invention and light sources, showing the way in which the lightguide plate guides light from the light sources.

FIG. 13 is a perspective view of a part of the light-entrance surface side of a lightguide plate according to a tenth embodiment of the present invention.

FIG. 14 is a longitudinal sectional side view of a lightguide plate according to a modification of the lightguide plate in FIG. 3 and light sources, showing the way in which additional lightguide portions are formed on both the upper and lower surfaces of the lightguide plate body.

DETAILED DESCRIPTION OF THE INVENTION

Referring to FIGS. 1 and 2, a lightguide plate 1 according to a first embodiment of the present invention has a rectangular lightguide plate body 3 and additional lightguide portions 4 provided on the lightguide plate body 3. Each additional lightguide portion 4 is substantially semielliptic in longitudinal sectional side view.

The lightguide plate body 3 has an upper surface 3b as a light-exiting surface, a lower surface 3c opposite to the upper surface, and a peripheral side surface extending between the respective peripheral edges of the upper and lower surfaces 3b and 3c. A circumferential part of the peripheral side surface forms a light-entrance surface 3a disposed to face light-exiting surfaces 2a of light sources 2. The additional lightguide portions 4 are provided on the upper surface 3b of the lightguide plate body 3, being spaced from each other positionally corresponding to the light sources in the circumferential direction of the peripheral side surface or in the width direction of the light-entrance surface 3a. It should be noted that, regarding the section of the lightguide plate 1 in each drawing, hatching is omitted for clarity of illustration of guided light (shown by the two-dot chain lines).

The light sources 2 are LED light sources each comprising, for example, a white LED that can emit light laterally toward the light-entrance surface 3a of the lightguide plate body 3 and the associated additional lightguide portion 4. The white LED is, for example, a semiconductor light-emitting element fabricated on a substrate and sealed with a resin material. The semiconductor light-emitting element is, for example, a blue (wavelength λ: 470 to 490 nm) LED element or an ultraviolet (wavelength λ: less than 470 nm) LED element, which may be formed by stacking a plurality of semiconductor layers of a gallium nitride compound semiconductor (e.g. InGaN compound semiconductor) on an insulating substrate, e.g. a sapphire substrate.

The resin material used to seal the LED element may be formed by adding a YAG fluorescent substance, for example, into a silicone resin as a main component. The YAG fluorescent substance converts a part of blue or ultraviolet light from the LED element into yellow light, and white light is produced by color mixing of the blue or ultraviolet light and the yellow light. It should be noted that it is possible to use various white LEDs besides those described above.

The lightguide plate body 3 is made of a light-transmitting resin material, e.g. a polycarbonate or acrylic resin. In this embodiment, a film-shaped lightguide plate material formed with a constant thickness by roll-to-roll processing is employed as the lightguide plate body 3.

The light sources 2 are installed with their optical axes L extending perpendicular to the light-entrance surface 3a of the lightguide plate body 3.

The total thickness of the lightguide plate body 3 and the additional lightguide portions 4 coincides with the height of the light-exiting surfaces 2a of the light sources 2.

The additional lightguide portions 4 are formed of a setting resin, e.g. an ultraviolet (UV) curing resin or a thermosetting resin, applied directly to the upper surface 3b of the lightguide plate body 3 and hardened. The additional lightguide portions 4 may be formed on the lower surface 3c of the lightguide plate body 3 or on both the upper and lower surfaces 3b and 3c. The additional lightguide portions 4 have, as shown in FIG. 2, respective light-entrance surfaces 4a through which the lightguide plate 1 receives light from the light-exiting surfaces 2a of the light sources 2 in addition to through the light-entrance surface 3a of the lightguide plate body 3. The additional lightguide portions 4 receive light from the light sources 2 and guide the received light into the lightguide plate body 3. The additional lightguide portions 4 are formed of a material having a lower refractive index than that of the lightguide plate body 3 to prevent total reflection of light when light enters the lightguide plate body 3 from the additional lightguide portions 4.

The additional lightguide portions 4 are formed by applying a liquid resin to the lightguide plate body 3 by potting, printing, etc. and hardening the applied resin. This process is easier and less costly than the injection molding process or the like used in the above-described conventional technique. In this embodiment, the width of each additional lightguide portion 4 is set to 4 mm or less. Each additional lightguide portion 4 may be provided with a tapered surface at a position opposite to the light-entrance surface 4a. The tapered surface is inclined from the upper part of the additional lightguide portion 4 toward the upper surface 3b of the lightguide plate body 3. The tapered surface can be formed easily by gradually reducing the printing width when the additional lightguide portions 4 are provided on the lightguide plate body 3 by printing, for example.

A backlight unit 5 shown in FIG. 1 has a lightguide plate 1, light sources 2, a diffusing sheet 6 disposed over the lightguide plate 1 to diffuse light from the lightguide plate 1 to make the light intensity uniform, a combination of a first prism sheet 8A and a second prism sheet 8B disposed over the diffusing sheet 6 to direct light from the diffusing sheet 6 upward toward a liquid crystal display panel (image display panel) 7 as illuminating light, and a reflecting sheet 9 disposed underneath the lightguide plate 1.

The diffusing sheet 6 is a sheet made of a transparent resin, e.g. an acrylic or polycarbonate resin, having silica particles or the like dispersed in it.

The first and second prism sheets 8A and 8B are transparent sheet-shaped members for collecting light from the diffusing sheet 6 into upward light and each prism sheet has a plurality of mutually parallel prisms on their upper surfaces. The first and second prism sheets 8A and 8B are set with their prisms intersecting each other in plan view. To obtain light having high directivity in the upward direction, in particular, the first prism sheet 8A is set with its prisms perpendicularly intersecting the optical axes of light from the light sources 2 in plan view, and the second prism sheet 8B is set with its prisms extending parallel to the optical axes of light from the light sources 2. In other words, the first and second prism sheets 8A and 8B are set with their respective prisms perpendicularly intersecting each other in plan view.

The reflecting sheet 9 is a metal plate, film, foil or the like having a light-reflecting function. In this embodiment, the reflecting sheet 9 is a film provided with an evaporated silver layer. An evaporated aluminum layer or the like may be used in place of the evaporated silver layer. The reflecting sheet 9 is bonded to a holder (not shown) that houses the various sheets constituting the backlight unit 5.

The display apparatus 10 is a liquid crystal display apparatus applicable, for example, to the liquid crystal displays of mobile phones, notebook personal computers (PCs), car navigation systems, mobile PCs, personal digital assistants (PDAs), automatic teller machines (ATMs), etc. The display apparatus 10 has a liquid crystal display panel 7 and a backlight unit 5 disposed at the back of the liquid crystal display panel 7.

The liquid crystal display panel 7 is a transmissive or semitransmissive liquid crystal display panel. In the case of a transmissive liquid crystal display panel 7, for example, it has a TFT, STN, TN or other liquid crystal panel body having a liquid crystal material sealed with a sealant in a gap between an upper substrate and a lower substrate, each having a transparent electrode layer, an alignment film and a polarizer.

The lightguide plate 1 of this embodiment has the additional lightguide portions 4 provided on the upper surface (light-exiting surface) 3b of the lightguide plate body 3 along at least a portion of the light-entrance surface 3a of the lightguide plate body 3. Accordingly, the lightguide plate 1 mainly receives light from the light sources 2 directly through the light-entrance surface 3a of the lightguide plate body 3. In addition, the lightguide plate 1 receives light failing to enter through the light-entrance surface 3a of the lightguide plate body 3, which is thin, through the light-entrance surfaces 4a of the additional lightguide portions 4 having surfaces to be flush with the light-entrance surface 3a of the lightguide plate body 3 and guides the received light into the lightguide plate body 3. Thus, the lightguide plate 1 can obtain higher light entrance efficiency and higher luminance at the light-exiting surface than in the case of the above-described conventional lightguide plates. In addition, the lightguide plate 1 can be reduced in thickness.

Accordingly, the backlight unit 5 and the display apparatus 10, which have the lightguide plate 1 of this embodiment, can be reduced in thickness and having high efficiency of light entering from the light sources 2. Thus, it is possible to obtain high luminance and satisfactory image display.

Other embodiments of the lightguide plate according to the present invention will be explained below with reference to FIGS. 3 to 13. It should be noted that, in the following explanation of each embodiment, the same constituent elements as those in the foregoing first embodiment are denoted by the same reference numerals as used in the first embodiment, and a description for them is omitted herein.

FIG. 3 shows a lightguide plate 21 according to a second embodiment of the present invention. Unlike the lightguide plate 1 of the first embodiment, the lightguide plate 21 of the second embodiment has an elongated additional lightguide portion 24 extending continuously along the width direction of the light-entrance surface 3a of the lightguide plate body 3. The additional lightguide portion 24 has a light-entrance surface 24a which is flush with the light-entrance surface 3a of the lightguide plate body 3 and a tapered surface 24b opposite to the light-entrance surface 24a.

To make the lightguide plate 21, as shown in FIG. 5, first, a large-sized lightguide film 23 is prepared, and a setting resin 25 is applied directly to a predetermined linear region on the lightguide film 23 (in the illustrated example, the setting resin 25 is applied along the transversal line passing through the center of the lightguide film 23) and hardened. Next, the lightguide film 23 is cut along the cutting line 25a, i.e. along the center of the transversal line, into two lightguide plates 21. The cut surface of each of the cut halves of the lightguide film 23 forms an integrated light-entrance surface of one lightguide plate 21 that comprises the light-entrance surfaces 3a and 24a.

Thus, the lightguide plate 21 of the second embodiment has an additional lightguide portion 24 that has a light-entrance surface 24a disposed to face the light-exiting surfaces 2a of the light sources 2 and a tapered surface 24b that comes closer to the upper surface 3b of the lightguide plate body 3 as it comes farther away from the light-entrance surface 24a. Therefore, the lightguide plate 21 can guide light entering through the light-entrance surface 24a into the lightguide plate body 3 by reflecting the light inward the lightguide plate body 3 from the tapered surface 24b.

With this lightguide plate manufacturing method, lightguide plates 21 can be readily mass-produced simply by applying a setting resin 25 to a large-sized lightguide film 23 and cutting the lightguide film 23 and each of the lightguide plate 21 has flat light-entrance surfaces 3a and 24a. It should be noted that FIG. 14 shows a lightguide plate 21 as a modification of the lightguide plate 21 shown in FIG. 3, which is formed by applying a setting resin 25 directly to mutually aligned linear regions on the upper and lower surfaces of a lightguide film 23 in the same way as shown in FIG. 5 and cutting the lightguide film 23 in the same way as in FIG. 5. In the modified lightguide plate 21 shown in FIG. 14, the light-entrance surface of the lightguide plate 21 is formed by the light-entrance surface 3a of the lightguide plate body 3 and the light-entrance surfaces 24a of the upper and lower additional lightguide portions 24 that are flush with the light-entrance surface 3a.

FIG. 6 shows a lightguide plate 31 according to a third embodiment of the present invention. Unlike those according to the foregoing embodiments, the lightguide plate 31 has an additional lightguide portion 34 that is bonded to the lightguide plate body 3 with light-transmitting double-sided adhesive tape or light-transmitting adhesive 35. As the additional lightguide portion 34, a molded resin member made of an acrylic resin, PC, PET or the like may be used.

In the lightguide plate 31 of the third embodiment, an additional lightguide portion 34 can be provided on the lightguide plate body 3 with high accuracy and in various configurations by using a molded resin member. In the illustrated example, the additional lightguide portion 34 has a flat light-entrance surface 34a parallel to the light-exiting surfaces 2a of the light sources 2 and flush with the light-entrance surface 3a of the lightguide plate body 3, and a tapered surface 34b inclined at a desired angle from the upper surface of the additional lightguide portion 34 toward the upper surface 3b of the lightguide plate body 3. It should be noted that the tapered surface 34b is preferably set at an angle of 5 degrees or less to the upper surface 3b of the lightguide plate body 3 that serves as a light-exiting surface.

FIG. 7 shows a lightguide plate 41 according to a fourth embodiment of the present invention. Unlike the lightguide plate 31 of the third embodiment, the lightguide plate 41 has a film-shaped additional lightguide portion 44 without a tapered surface. As the additional lightguide portion 44, a lightguide film of an acrylic resin, PC, PET or the like may be used. Because of using a film-shaped additional lightguide portion 44, the lightguide plate 41 can be readily made simply by cutting a lightguide film into a predetermined shape and bonding the cut lightguide film to the lightguide plate body 3 with the light-entrance surface of the additional lightguide portion 44 being flush with the light-entrance surface 3a of the lightguide plate body 3.

FIG. 8 shows a lightguide plate 51 according to a fifth embodiment of the present invention. The lightguide plate 51 has an additional lightguide portion 54 formed by providing a tapered part 54b formed of a light-transmitting adhesive at the rear end of a film-shaped lightguide part 54c that is the same as the additional lightguide portion 44 in the fourth embodiment. With this structure, the efficiency of light entering the lightguide plate body 3 can be increased more than that of the fourth embodiment.

FIG. 9 shows a lightguide plate 61 according to a sixth embodiment of the present invention. The lightguide plate 61 has an additional lightguide portion 64 made of a setting resin. In this embodiment, the setting resin is also filled in the gap between the light-exiting surface 2a of each light source 2 and the light-entrance surface 3a of the lightguide plate body 3. With this structure, the setting resin fills the gap between the light-exiting surface 2a of each light source 2 on the one hand and, on the other, the light-entrance surface 3a of the lightguide plate body 3 and the light-entrance surface 64a of the additional lightguide portion 64 to eliminate the air layer. Accordingly, it is possible to reduce the loss of light due to reflection at the interface. In addition, the light sources 2 and the lightguide plate 61 can be properly positioned and secured to each other, which facilitates the handling of the lightguide plate 61.

FIGS. 10 to 12 show lightguide plates 71, 81 and 91 according to seventh to ninth embodiments of the present invention. The lightguide plates 71, 81 and 91 are similar to the lightguide plates according to the third to fifth embodiments, respectively, but different from them in that reflecting parts 74d, 84d and 94d are provided on the respective upper surfaces of the additional lightguide portions 74, 84 and 94 to reflect light from the light sources 2 toward the lightguide plate body 3. The reflecting parts 74d, 84d and 94d may each comprise a reflecting member, e.g. a metal plate, film or foil, or a reflecting layer, e.g. an evaporated silver layer or an evaporated aluminum layer, or a reflecting optical configuration, e.g. prism or hologram configuration. With this structure, the efficiency of light entering the lightguide plate body 3 can be further increased.

FIG. 13 shows a lightguide plate 101 according to a tenth embodiment of the present invention. The lightguide plate 101 has an additional lightguide portion 104 that has prism-shaped light-entrance optical configurations 104c formed on its light-entrance surface 104a to refract entering light to control the propagation direction of the light. The provision of the prism-shaped light-entrance optical configurations 104c is mainly to diffuse light to increase the efficiency of light entering the lightguide plate body 3 and to improve the luminance uniformity on the light-exiting surface of the lightguide plate body 3. As the light-entrance optical configurations 104c, it is possible to use lens-shaped, curved surface-shaped or wave-shaped configurations besides the prism-shaped configurations in accordance with the overall shape of the additional lightguide portion 104 and the thickness of the lightguide plate body 3.

It should be noted that the present invention is not necessarily limited to the foregoing embodiments but can be modified in a variety of ways without departing from the scope of the present invention.

For example, in the foregoing embodiments, an additional lightguide portion is formed or installed on the upper surface (serving as a light-exiting surface) of the lightguide plate body at the light-entrance surface side. The additional lightguide portion may, however, be provided on the lower surface of the lightguide plate body, which is opposite to the light-exiting surface, or on each of the upper and lower surfaces of the lightguide plate body at the light-entrance surface side.

Although a diffusing sheet is used in the backlight unit of the foregoing embodiments, the diffusing sheet may be omitted from the backlight unit. Although two prism sheets are used in the foregoing embodiments, the backlight unit may have only one prism sheet.

Although the display apparatus of the foregoing embodiments employs a liquid crystal display panel as an image display panel, other types of image display panels may be used, for example, an electronic paper. In this case, the planar light unit of the present invention is installed as a front light unit at the front side of the electronic paper body.

It should be noted that the present invention is not necessarily limited to the foregoing embodiment but can be modified in a variety of ways without departing from the gist of the present invention.

The invention claimed is:

1. A lightguide plate manufacturing method comprising:
providing a lightguide film;
applying a setting resin by potting or printing directly to a predetermined linear region on the lightguide film;
hardening the setting resin to form a first additional lightguide portion; and
cutting the lightguide film with the first additional lightguide portion provided on the lightguide film along a length direction of the predetermined linear region such that a cut surface of the lightguide film and a cut surface of the first additional lightguide portion are flush with each other.

2. The method of claim 1, wherein the first additional lightguide portion has a refractive index that is lower than a refractive index of the lightguide plate body.

3. The method of claim 1, wherein the first additional lightguide portion is disposed on an upper surface of the lightguide film,
wherein the method further comprising:
(i) applying a setting resin by potting or printing directly to a linear region on a lower surface of the lightguide film to form a second additional lightguide portion that is opposite to the first additional lightguide portion on the upper surface; and
(ii) hardening the setting resin of the second additional lightguide portion,
wherein said cutting operation is performed with the second additional lightguide portion on the lower surface of the lightguide plate such that a cut surface of the second additional lightguide portion is flush with a cut surface of the lightguide film.

4. The method of claim 3, further comprising:
after said hardening the setting resin of both additional lightguide portions, forming reflecting layers on the first additional lightguide portion and the second additional lightguide portion.

5. The method of claim 1, further comprising:
after said hardening operation, forming a reflecting layer on the first additional lightguide portion.

6. The method of claim 1, further comprising forming a reflecting layer on the first additional lightguide portion,
wherein said cutting operation is performed with the reflecting layer disposed on the first additional lightguide portion such that a cut surface of the reflecting layer is flush with the cut surface of the lightguide film.

7. The method of claim 6, wherein the first additional lightguide portion has a refractive index that is lower than a refractive index of the lightguide plate body.

8. A lightguide plate obtained by the lightguide plate manufacturing method of claim 1, wherein the first additional lightguide portion has a refractive index that is lower than a refractive index of the lightguide plate body.

* * * * *